(12) United States Patent
Eichenhofer et al.

(10) Patent No.: US 10,507,603 B2
(45) Date of Patent: Dec. 17, 2019

(54) METHOD FOR REINFORCING A BASE STRUCTURE

(71) Applicant: 9T Labs AG, Zürich (CH)

(72) Inventors: Martin Eichenhofer, Deggenhausertal (DE); Florian Eichenhofer, Deggenhausertal (DE)

(73) Assignee: 9T Labs AG, Zurich (CH)

( * ) Notice: Subject to any disclaimer, the term of this patent is extended or adjusted under 35 U.S.C. 154(b) by 0 days.

(21) Appl. No.: 15/580,533

(22) PCT Filed: May 27, 2016

(86) PCT No.: PCT/EP2016/000878
§ 371 (c)(1),
(2) Date: Dec. 7, 2017

(87) PCT Pub. No.: WO2016/198148
PCT Pub. Date: Dec. 15, 2016

(65) Prior Publication Data
US 2018/0169906 A1 Jun. 21, 2018

(30) Foreign Application Priority Data
Jun. 11, 2015 (DE) .................. 10 2015 007 317

(51) Int. Cl.
*B29C 37/00* (2006.01)
*B29C 48/03* (2019.01)
(Continued)

(52) U.S. Cl.
CPC ...... *B29C 37/0082* (2013.01); *B29C 48/0022* (2019.02); *B29C 48/03* (2019.02); *B29C 70/521* (2013.01)

(58) Field of Classification Search
CPC ... B29C 70/521; B29C 70/682; B29C 70/747; B29C 70/78; B29C 70/86;
(Continued)

(56) References Cited

U.S. PATENT DOCUMENTS 5,091,036 A 2/1992 Taylor
5,358,397 A 10/1994 Ligon et al.
(Continued)

FOREIGN PATENT DOCUMENTS

DE 202004011250 U1 10/2004
DE 102006008728 B3 7/2007
(Continued)

OTHER PUBLICATIONS

International Search Report of PCT/EP2016/000878, dated Sep. 15, 2016.
(Continued)

*Primary Examiner* — Vishal I Patel
(74) *Attorney, Agent, or Firm* — Collard & Roe, P.C.

(57) ABSTRACT

A method for reinforcing an existing base structure with at least one reinforcing structure so as to form a support structure having the following steps: producing the at least one reinforcing structure, connecting the at least one reinforcing structure to the base structure such that the at least one reinforcing structure is connected to the base structure in a connection position and the base structure together with the at least one reinforcing structure forms the support structure. The at least one reinforcing structure is made of a composite material comprising fibers and a matrix by means of pultrusion and/or extrusion, and a pultrusion unit and/or an extrusion unit is moved in space such that the at least one reinforcing structure, is pultruded and/or extruded onto the base structure at the respective required connection position after the pultrusion and/or extrusion.

23 Claims, 8 Drawing Sheets

Figure 1:
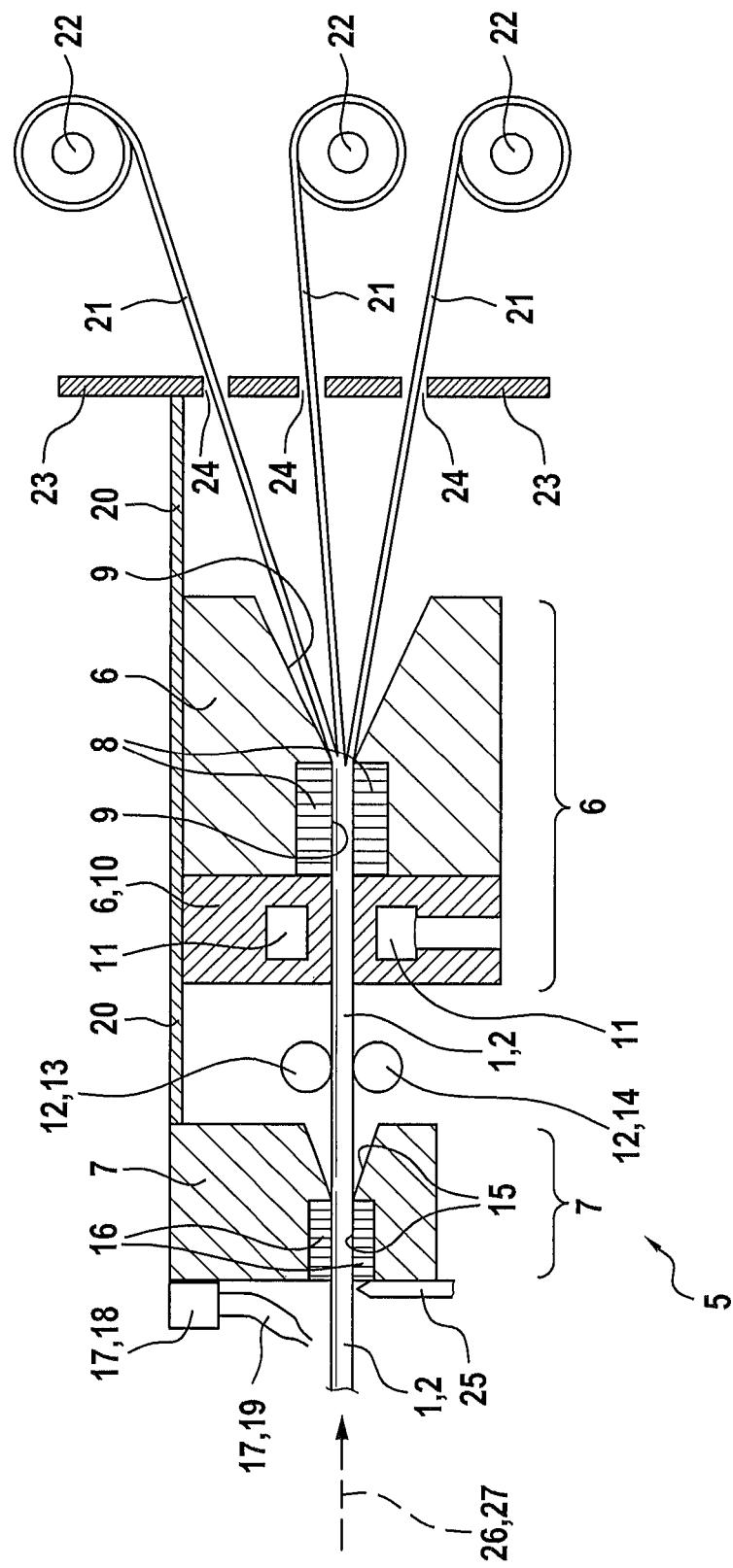

(51) Int. Cl.
*B29C 48/00* (2019.01)
*B29C 70/52* (2006.01)

(58) Field of Classification Search
CPC .............. B29C 47/0002; B29C 47/026; B29C 37/0082; B29C 2793/0009; B29C 2793/0081; B29C 47/0009; B29C 47/0066; B29C 47/0866; B29C 47/1036; B29D 99/001
See application file for complete search history.

(56) References Cited

U.S. PATENT DOCUMENTS

| | | | |
|---|---|---|---|
| 5,644,888 A | | 7/1997 | Johnson |
| 2002/0170941 A1 | | 11/2002 | Wallach et al. |
| 2005/0276945 A1 | | 12/2005 | Muggli et al. |
| 2009/0112343 A1 | | 4/2009 | Yuan et al. |
| 2017/0057149 A1 * | | 3/2017 | Eichenhofer ......... B29C 70/845 |

FOREIGN PATENT DOCUMENTS

| | | | | |
|---|---|---|---|---|
| DE | 102012109671 A1 | | 9/2013 | |
| DE | 102014006706 A1 * | | 9/2014 | ......... B29C 66/7212 |
| DE | 102014006706 A1 | | 9/2014 | |
| EP | 2 676 784 A1 | | 12/2013 | |
| EP | 2676784 A1 * | | 12/2013 | ......... B29D 99/0078 |
| WO | 2009055580 A2 | | 4/2009 | |
| WO | 2010046305 A2 | | 4/2010 | |
| WO | 2015169414 A1 | | 11/2015 | |

OTHER PUBLICATIONS

International Search Report of PCT/EP2016/001690, dated Feb. 17, 2017.
International Search Report of PCT/EP2015/000736, dated Aug. 6, 2015.

* cited by examiner

METHOD FOR REINFORCING A BASE STRUCTURE

CROSS REFERENCE TO RELATED APPLICATIONS

This application is the National Stage of PCT/EP2016/000878 filed on May 27, 2016, which claims priority under 35 U.S.C. § 119 of German Application No. 10 2015 007 317.6 filed on Jun. 11, 2015, the disclosures of which are incorporated by reference. The international application under PCT article 21(2) was not published in English.

The present invention relates to a method for reinforcing an existing base structure according to the preamble of claim 1 and a support structure according to the preamble of claim 14.

Support structures comprise a base structure and a reinforcing structure. As two-dimensional base structures, for example, plates, discs, domes or a partial ellipsoid of revolution are used. In order to obtain a sufficient load carrying capacity and stiffness of the base structures, the reinforcing structures, such as struts or rods, are first produced in a complex manner, and then the struts and rods are connected to the base structure in order to obtain sufficient load carrying capacity and stiffness of the support structure as a combination of base structure and at least one reinforcing structure. However, this is laborious and expensive. In addition, the reinforcement structures can be adapted only with great effort to different geometries of base structures.

A method for producing a three-dimensional object made of a composite material is known from US 2014/0061974 A1. Two or more materials are simultaneously extruded as a composite material.

The object of the present invention is therefore to provide a method for reinforcing an existing base structure with at least one reinforcing structure so as to form a support structure in which the base structure can be low costly and reliably reinforced with a low technical effort.

This object is achieved by a method for reinforcing an existing base structure with at least one reinforcing structure so as to form a support structure and/or by a method for producing a support structure having the following steps: preferably making available or producing a base structure, producing the at least one reinforcing structure, connecting the at least one reinforcing structure to the base structure such that the at least one reinforcing structure is connected to the base structure in a connection position and the base structure together with the at least one reinforcing structure forms the support structure, whereby the at least one reinforcing structure, in particular all of the reinforcing structures, is or are made of a composite material comprising fibers and a matrix by means of pultrusion and/or extrusion, and a pultrusion unit and/or an extrusion unit is moved in space such that the at least one reinforcing structure, in particular all of the reinforcing structures, is or are pultruded and/or extruded onto the base structure at the respective required connection position after the pultrusion and/or extrusion. The reinforcing structures are pultruded and/or extruded at and/or onto the base structure at the respective required connection position, so that after the pultrusion and/or extrusion the at least one reinforcing structure must not be moved relative to the base structure. The costs for producing the support structure can be significantly reduced, because the at least one reinforcing structure is already produced at the respective required connection position, in which the at least one reinforcing structure is to be connected respectively fixed to the base structure. A laborious subsequent arrangement of the already produced reinforcing structures at the respective required connection position is therefore in an advantageous way not any more necessary.

In a further embodiment the pultruded and/or extruded at least one reinforcing structure, in particular all of the reinforcing structures, is or are after the pultrusion and/or extrusion and after laying onto the base structure not moved relative to the base structure and/or the matrix of the pultruded and/or extruded reinforcing structure, in particular all of the reinforcing structures, hardens at the required position at and/or on the base structure and/or the pultrusion and extrusion is carried out simultaneously and/or continuously.

In a further variant for the production of the reinforcing structure the pultrusion is carried out as a first step and as a second step, the extrusion is carried out, so that the in the first step partially produced pultruded at least one reinforcing structure, in particular all of the reinforcing structures, is or are post-processed with extrusion and/or the at least one reinforcing structure, preferably all of the reinforcing structures, is or are produced, in particular continuously, in a way that the pultrusion unit and/or extrusion unit, in particular continuously, is moved in space in a movement path at and/or in the range of the required connection position in a distance to the base structure. The distance is small in the range of less a few mm or cm. The pultrusion unit and/or the extrusion unit is moved mainly at the required position, because after the moving of the at least one reinforcing structure out of the process unit the reinforcing structure has only small distance to the base structure.

Practicable the at least one reinforcing structure is produced as a straight rod or a curved rod and/or the movement path is in the main a straight line and/or a, preferably curved, line and/or the pultrusion unit and/or extrusion unit is moved with a robot and/or after the pultrusion and/or extrusion of each reinforcing structure with a cutting unit the composite material with fibers and matrix is cut.

In a further variant each of the at least one reinforcing structure is produced with a length that is at least 2, 4, 5, 10 or 20 times larger than the diameter of this reinforcing structure and/or the cross-sectional shape of the at least one reinforcing structure, in particular all of the reinforcing structures, is or are formed during extrusion and/or during the laying onto the base structure and/or the length of the reinforcing structure, in particular all of the reinforcing structures, is or are formed by the length of the movement path of the pultrusion unit and/or extrusion unit and/or the at least one reinforcing structure, in particular all of the reinforcing structures, are made without a cavity and/or without a hollow channel. During the laying of the at least one reinforcing structure onto the base structure the composite material is not fully cooled down and therefore formable, so that the composite material is matched to the geometry of the base structure by deforming.

In a supplementary embodiment the fibers and preferably the matrix are continuously conveyed first through the pultrusion unit and subsequently through the extrusion unit and/or hybrid yarns with fibers and matrix are conveyed to the pultrusion unit or the fibers and the matrix are conveyed separately to the pultrusion unit and/or the fibers or hybrid yarns are uncoiled from coils and conveyed to the pultrusion unit and/or the at least one reinforcing structure, in particular all of the reinforcing structures, is ore are produced so that at least one fiber, preferably a plurality of fibers, is or are arranged at an outer side of the at least one reinforcing structure, in particular all of the reinforcing structures and/or the at least one reinforcing structure, in particular all of the reinforcing structures, is or are produced so that at least one fiber, preferably a plurality of fibers, does not have a complete covering with the matrix and/or the at least one reinforcing structure, in particular all of the reinforcing structures is or are produced so that the matrix is arranged between the fibers. In the reinforcing structures the fibers are by cohesive connection fixed to the matrix, because the matrix is hardened. The fibers are also arranged at the outer side of the at least one reinforcing structures, so that the fibers are at the outer side of the at least one reinforcing structures visible respectively tangible. Especially are the fibers not in an inside area of the reinforcing structures and the matrix is not an outside cover. In fact the fibers and the matrix are distributed at the cross-sectional area and between the fibers is also arranged the matrix. A reinforcing structure, especially a rod, comprises preferably for example at least two, three, five or ten fibers.

In a further embodiment in the pultrusion unit during the pultrusion by means of the matrix the fibers are connected in a material-locking manner together, in particular by heating and/or hardening the matrix and/or the matrix is cooled and/or hardened during conveying from the pultrusion unit to the extrusion unit, so that the fibers are connected to one another in a material-locking manner and/or the fibers and the matrix are conveyed by means of a conveying device, for example with two conveyor wheels, in particular as the conveying device is acting onto the fibers with the matrix during the conveying of the fibers with the matrix from the pultrusion unit to the extrusion unit and/or the fibers and the matrix first are connected to one another in a material-locking manner by means of pultrusion, in particular by heating and/or hardening of the matrix, and then the cross-sectional shape of the rods is at least partially formed during extrusion in the extrusion unit and/or the at least one reinforcing structure, in particular all of the reinforcing structures is or are produced with a maximum diameter between 1 mm and 30 mm, in particular between 2 mm and 20 mm.

In a further embodiment, the fibers are heated with the matrix in the extrusion unit and/or in the extrusion unit the cross-sectional shape, preferably circular, ellipsoidal or rect-angular, of the at least one reinforcing structure is formed during extrusion and preferably because of the contact between the at least one reinforcing structure with the surface of the base structure the cross-sectional shape is once again shaped and/or in the pultrusion unit the fibers with the matrix are first heated, during the conveying of the fibers with the matrix from the pultrusion unit to the extrusion unit the fibers cool down and in the extrusion unit the fibers with the matrix are reheated and/or in the pultrusion unit the fibers with the matrix are with a, preferably first, cooling device actively cooled and/or the fibers with the matrix after being conveyed through the extrusion unit are actively cooled with a, preferably second, cooling device, for example a blower and/or the at least one reinforcing structure, in particular all of the reinforcing structures, concerning the length of the respective reinforcing structure for more than 50%, 70%, 80% or 90% are connected with the base structure, so that the length of the connection between the reinforcing structure and the base structure is bigger than 50%, 70%, 80% or 90% of the length of the reinforcing structure.

In a further embodiment, the at least one reinforcing structure, in particular all of the reinforcing structures, is or are produced with plastic, preferably thermoplastic and/or thermosetting plastic, and/or plastic as reactive hotmelt respectively hotmelt adhesive respectively melt polymer, as matrix and/or the at least one reinforcing structure, in particular all of the reinforcing structures, is or are produced with fibers as glass fibers, carbon fibers and/or aramid fibers, and/or the at least one reinforcing structure, in particular all of the reinforcing structures, is ore are made exclusively from matrix and fibers and/or the at least one reinforcing structure, in particular all of the reinforcing structures, is or are produced so that the mass fraction or volume fraction of the fibers is at least 30%, 40%, 60% or 80% and/or the at least one reinforcing structure, in particular all of the reinforcing structures, is or are produced so that the mass fraction or volume fraction of the matrix is less than 70% %, 60%, 40% or 20%, and/or the at least one reinforcing structure, in particular all of the reinforcing structures, is or are made so that the at least one reinforcing structure is formed exclusively from the fibers and the matrix. Plastics as reactive hotmelt respectively hotmelt adhesive respectively melt polymer are plastic having, preferably initially thermoplastic characteristics and/or are thermoplastics, and after at least one change parameter, for example heating and/or exposure to moisture and/or the irradiation with UV light and/or an oxygen withdrawal, by a chemical change, in particular at least one chemical reaction, have thermosetting characteristics and/or are a thermosetting plastic. By a heating variation parameter, the heating in the pultrusion unit and/or extrusion unit may be used as a parameter of change, and after the subsequent cooling and hardening of the matrix on the base structure, the support structure, in particular the reinforcing structure, also with heating has a sufficient load carrying capacity and/or stiffness. Thermo-setting plastics are when heated 100% solid, this means the hardening is not reversible by heating. The heating in the pultrusion unit and/or extrusion unit is carried out for example at temperatures between 60° C. and 200° C. In the case of a reactive hotmelt, for example based on polymers, the chemical change is carried out by a connection between existing macromolecular chains (so-called cross links). Reactive hot melts are based, for example, on EVA (ethylene-vinyl-acetate) and polyester or based on PA (polyimide) or based on polymers or based on PUR. Reactive hotmelts may also contain substances that are not plastics or adhesives. Adhesives are insofar also considered as plastics. The essential characteristic feature of the reactive hot melt or reactive hotmelt adhesive or reactive melt polymer is thus that after hardening due to the action of the at least one change parameter, heating of the at least one reinforcing structure does not cause melting of the reactive hotmelt or of the matrix from the reactive hotmelt, so that in spite of heating to normal temperatures for example to temperatures up to 200° C. or 300° C., for the use, the load carrying capacity and/or the stiffness is still guaranteed.

In a supplementary embodiment, the at least one reinforcing structure, in particular all of the reinforcing structures, is or are produced, so that the length of the fibers, in particular all of the fibers, corresponds in each reinforcing structure mainly to the length of the at least one reinforcing structure and/or the at least one reinforcing structure, in particular all of the reinforcing structures, cool and harden at the surface of the base structure. Mainly means that the length of the reinforcing structure corresponds to .a deviation of less than 30%, 20%, 10% or 5% to the length of the fibers in the respective reinforcing structure.

In a further embodiment before the laying of the at least one reinforcing structure onto the surface of the base structure locally in the region of the later contact area between the at least one reinforcing structure and the base structure the material of the base structure is removed.

Preferably the base structure is removed by machining, especially with a tool, preferably a milling tool, and the tool is moved with a robot along the surface of the base structure.

In an additional variant in the base structure because of the removing the material of the base structure a, preferably elongate, cutout is produced and in the cutout afterwards the at least one reinforcing structure is moved in, so that a positive connection between the at least one reinforcing structure and the base structure at the cutout, especially after the cooling and hardening of the matrix, is constructed.

In a further embodiment before the laying of the at least one reinforcing structure onto the surface of the base structure the surface of the base structure is locally in the region of the later contact area between the at least one reinforcing structure and the base structure is heated with a heating device for the base structure, especially a laser or an infrared radiator.

In an additional embodiment the heating device for the base structure is moved with a robot along the surface of the base structure and/or because of the heating of the surface of the base structure locally in the region of the later contact area between the at least one reinforcing structure and the base structure the characteristic feature of the material of the base structure is changed, especially becomes viscous and/or adhesive and/or liquid, so that a cohesive connection between the matrix of the at least one reinforcing structure and the material of the base structure, especially after the cooling, is constructed.

In a further embodiment before the laying of the at least one reinforcing structure onto the surface of the base structure locally in the region of the later contact area between the at least one reinforcing structure and the base structure with an adding device a material, especially adhesive and/or bonding agent, is coated for the improvement of the connection between the at least one reinforcing structure and the base structure.

Preferably the adding device is moved with a robot along the surface of the base structure.

In a further embodiment first the base structure is produced or is made available and then the at least one reinforcing structure is produced.

Suitably the base structure is produced with another method than the at least one reinforcing structure.

Support structure according to the invention, comprising a base structure, at least one reinforcing structure and the at least one reinforcing structure is connected with the base structure, such that the load carrying capacity and/or the stiffness of the support structure is improved and/or raised, whereby the at least one reinforcing structure and/or the support structure is being produced with a method described in this application and/or the length of the fibers, in particular of all the fibers, in each reinforcing structure is mainly identical to the length of this reinforcing structure.

Suitably, the base structure is designed of metal, in particular steel and/or aluminum, and/or plastic, in particular fiber-reinforced plastic, and/or in a sandwich construction of two different materials.

In a further variant, the base structure is designed as a planar component, a plate, a disc, a partial spherical shell, a dome, a partial ellipsoid of revolution, a tub or a cup.

In an additional embodiment, the base structure and/or the support structure is a load-bearing component, for example a joist, a stanchion, a strut, a flange, a dome, a plate, a disc, a partial spherical shell, a wall or a ceiling, for a wide variety of applications, in particular in mechanical engineering, civil engineering/building activities or electrical engineering.

In an additional embodiment, the at least one reinforcing structure is connected to a planar and/or curved surface of the base structure, preferably by producing the at least one reinforcing structure by means of extrusion and/or pultrusion at and/or on the planar and/or curved surface of the base structure.

In a suitable embodiment, the at least one reinforcing structure, in particular all of the reinforcing structures, is formed with plastic, preferably thermoplastic and/or thermosetting plastic, and/or plastic as reactive hotmelt respectively hotmelt adhesive respectively melt polymer, as matrix and/or the at least one reinforcing structure, preferably all of the reinforcing structures, are formed with fibers as glass fibers, carbon fibers and/or aramid fibers, and/or the at least one reinforcing structure, preferably all of the reinforcing structures, is ore are formed exclusively from matrix and fibers and/or concerning the at least one reinforcing structure, preferably all of the reinforcing structures, the mass fraction or volume fraction of the fibers is at least 30%, 40%, 60% or 80% and/or concerning the at least one reinforcing structure, preferably all of the reinforcing structures, the mass fraction or volume fraction of the matrix is less than 70% %, 60%, 40% or 20%, and/or the at least one reinforcing structure, preferably all of the reinforcing structures, are exclusively formed with the fibers and matrix and/or the at least one reinforcing structure, preferably all of the reinforcing structures, is ore are formed straight and/or curved and/or the length of the at least one reinforcing structure, preferably all of the reinforcing structures, is at least 2, 4, 5, 10 or 20 times greater than the diameter of the at least one reinforcing structure, preferably all of the reinforcing structures, and/or the at least one reinforcing structure, preferably all of the reinforcing structures, are formed without cavity, and/or the at least one reinforcing structure, preferably all of the reinforcing structures, are formed such that at least one fiber, respectively preferably a plurality of fibers, is or are arranged on the outer side so that the at least one fiber, preferably the fibers, are visible or tangible on the outer side of the at least one reinforcing structure, preferably all of the reinforcing structures, and/or at least one fiber, preferably a plurality of fibers, in the at least one reinforcing structure, preferably all of the reinforcing structures, do not have a complete covering with the matrix and/or the fibers are connected in a material-locking manner to each other with the matrix between the fibers.

The invention further comprises a computer program having program code means stored on a computer readable medium for carrying out a method described in this patent application when the computer program is performed on a computer or a corresponding computing unit.

The invention also provides a computer program product comprising program code means stored on a computer readable medium for carrying out a method described in this patent application when the computer program is performed on a computer or a corresponding computing unit.

Figure 2:
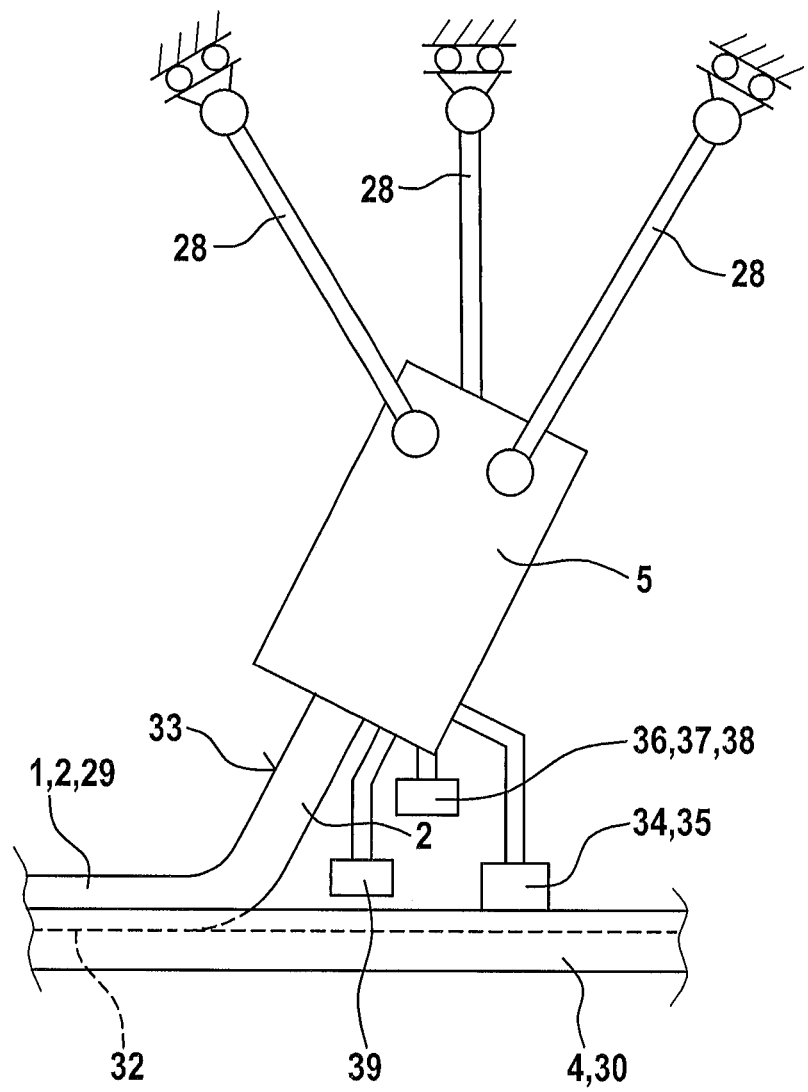
Figure 3:
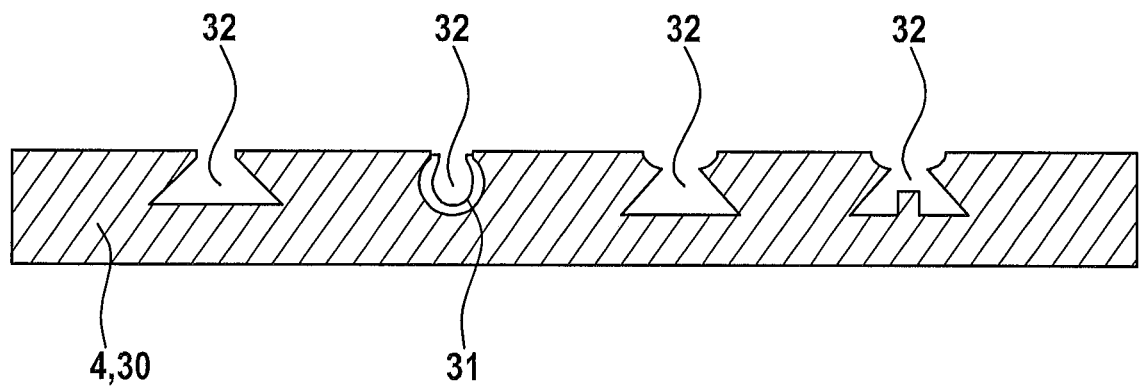
Figure 4:
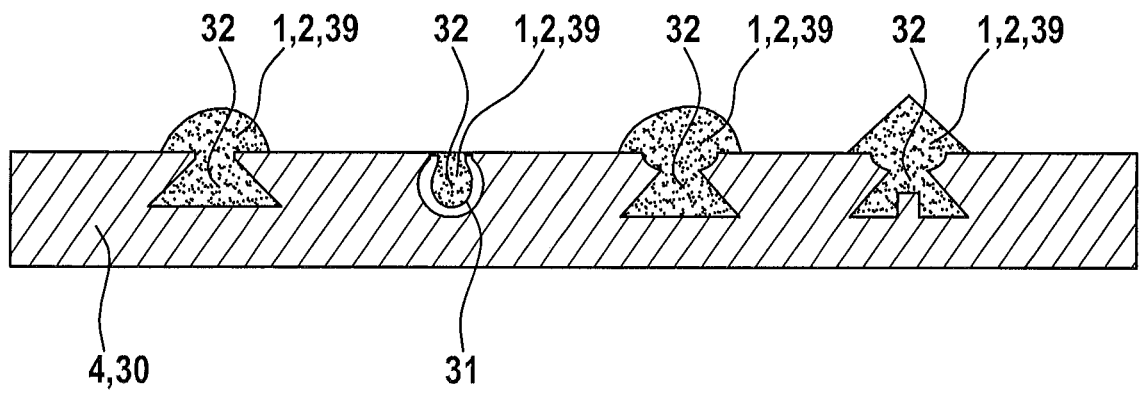
Figure 5:
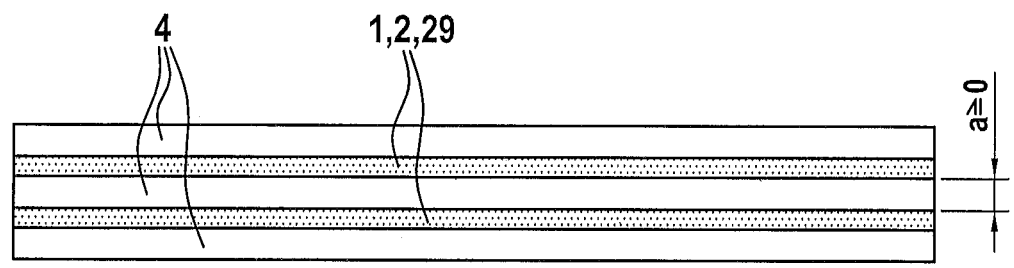
Figure 6:
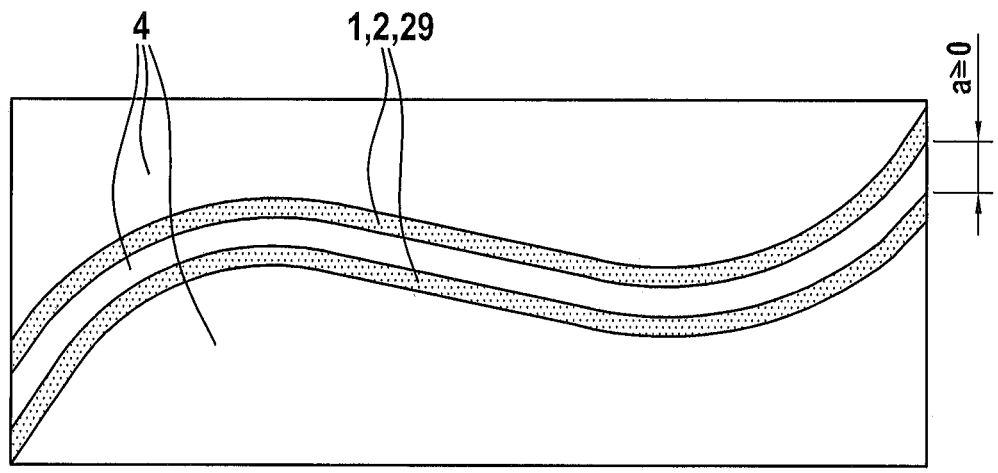
Figure 7:
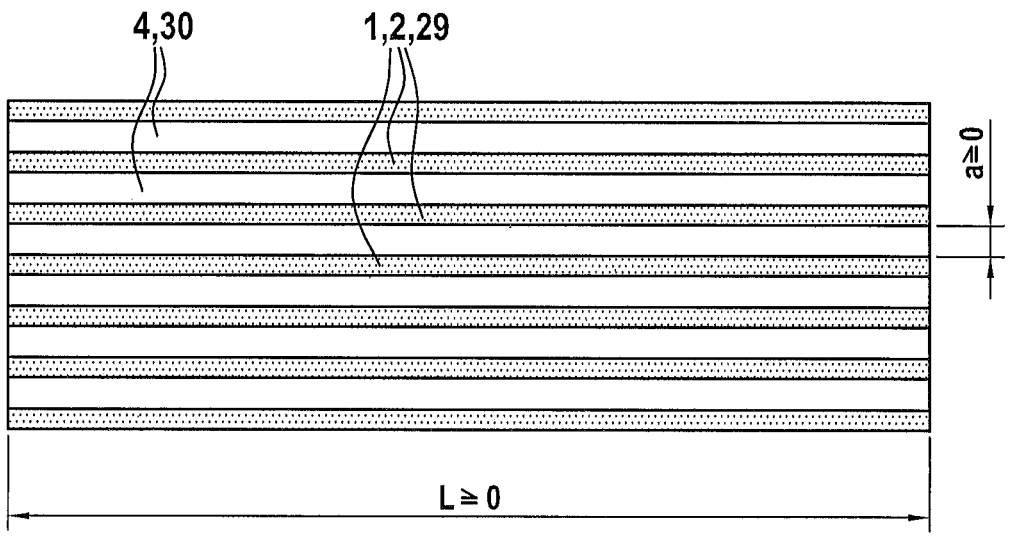
Figure 8:
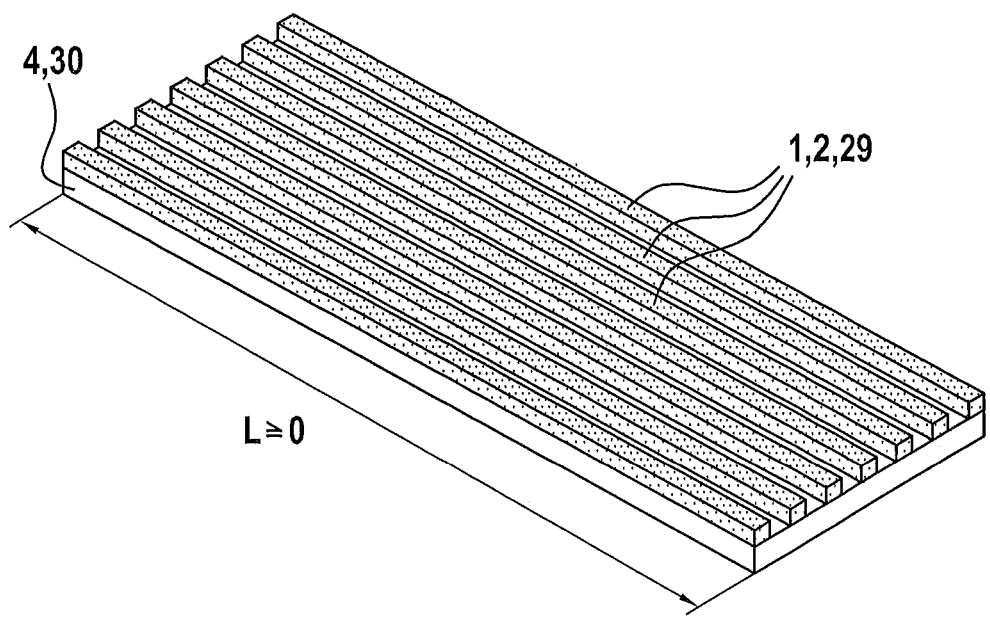
Figure 9:
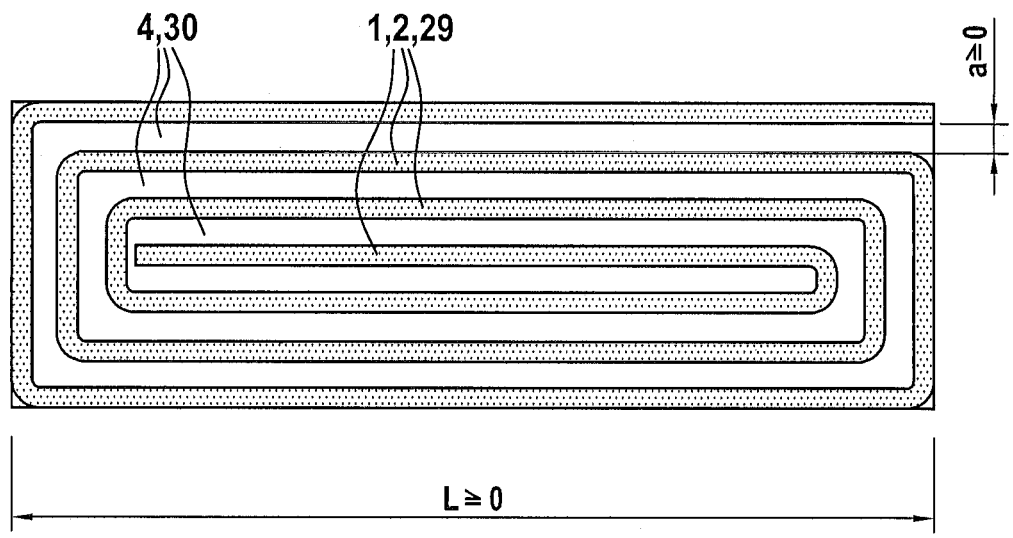
Figure 10:
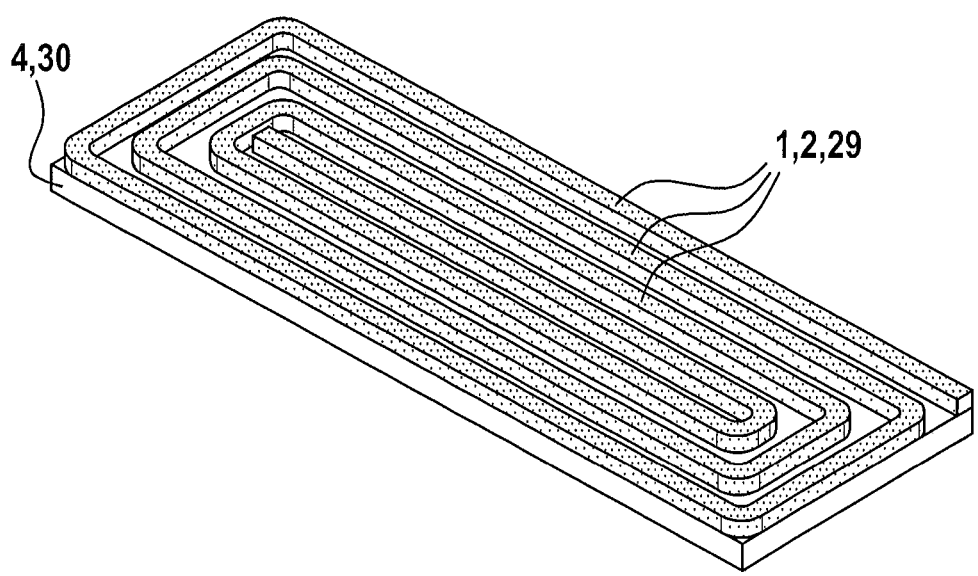
Figure 11:
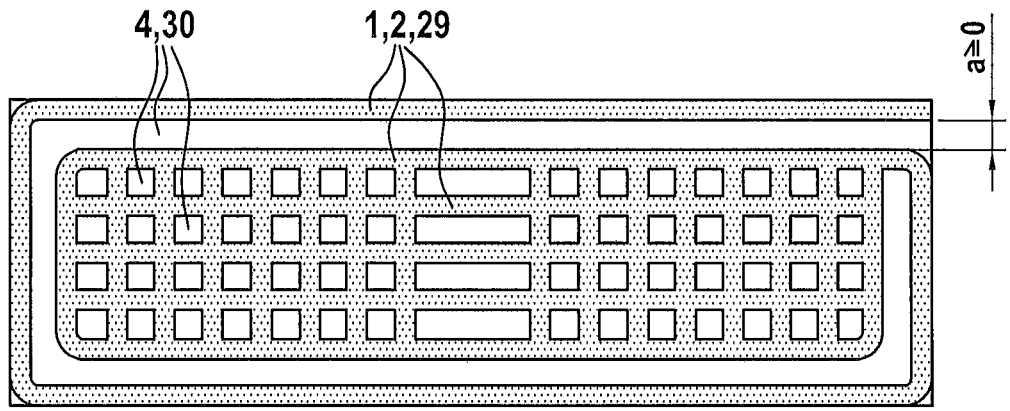
Figure 12:
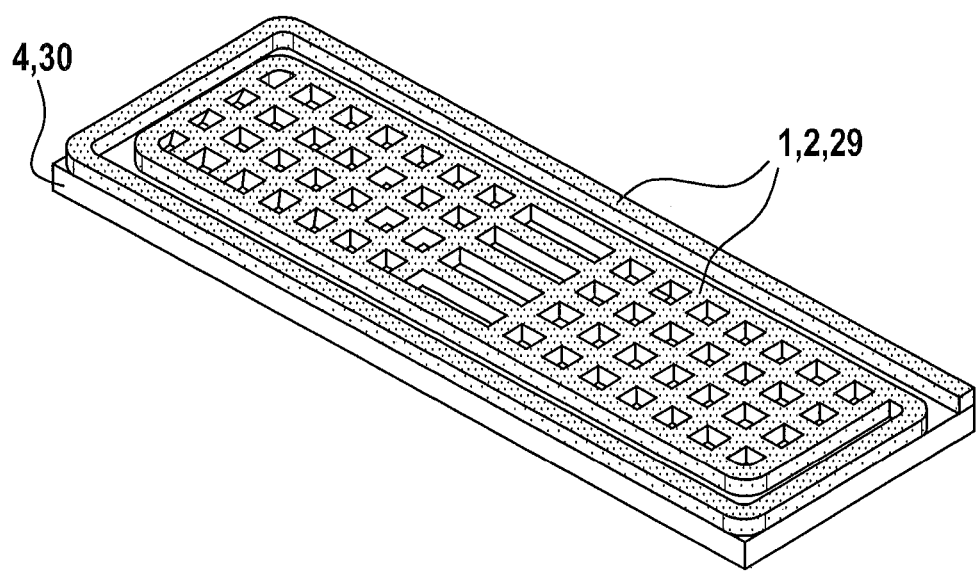
Figure 13:
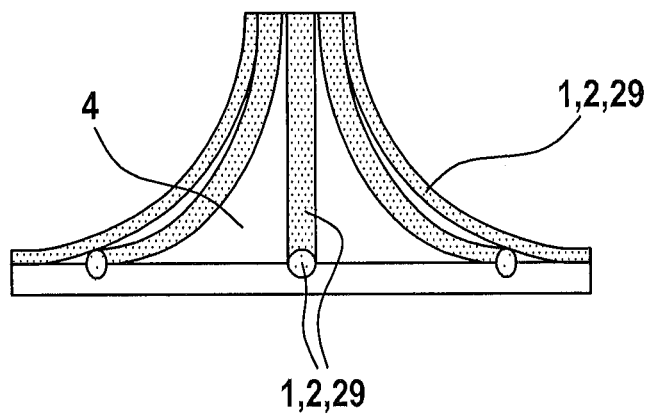
Figure 14:
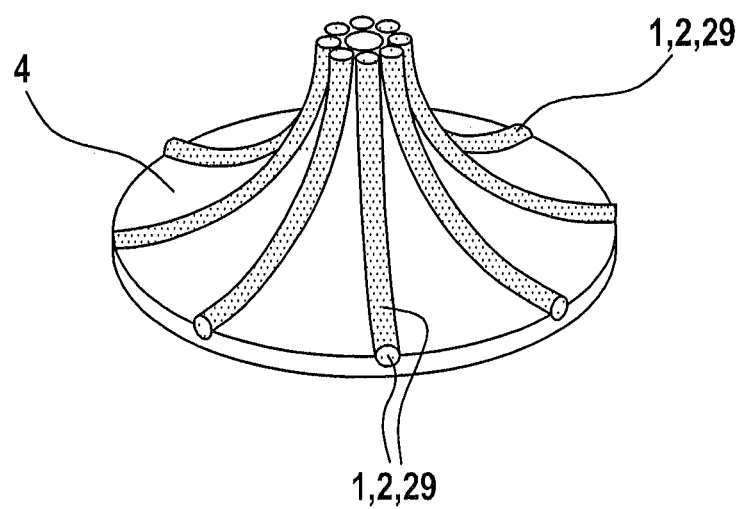

Embodiments of the invention are described in more detail below with reference to the accompanying drawings. It shows:

FIG. 1 shows a simplified longitudinal section of a process unit with a pultrusion unit and extrusion unit for carrying out the method, FIG. 2 shows a side view of the process unit during the execution of the method, FIG. 3 shows a cross-section of a base structure before the laying of a reinforcing structure, FIG. 4 shows the cross section of the base structure according to FIG. 3 after the laying of the reinforcing structure, FIG. 5 shows a cross section of base structures and reinforcing structures in a first exemplary embodiment, FIG. 6 shows the cross section of base structures and reinforcing structures in a second exemplary embodiment, FIG. 7 is a plan view of a base structure and reinforcing structures in a third embodiment, FIG. 8 is a perspective view of the base structure with reinforcing structures according to FIG. 7, FIG. 9 is a plan view of a base structure and reinforcing structures in a fourth embodiment, FIG. 10 is a perspective view of-the base structure with reinforcing structures according to FIG. 9, FIG. 11 is a plan view of a base structure and reinforcing structures in fifth embodiment, FIG. 12 is a perspective view of the base structure with reinforcing structures of FIG. 11, FIG. 13 is a side view of a base structure and reinforcing structures in a sixth embodiment, FIG. 14 shows a perspective view of the base structure with reinforcing structures according to FIG. 13.

FIGS. 1 and 2 shows a process unit 5 for the production of a reinforcing structure 1. The process unit 5 comprises a pultrusion unit 6 and an extrusion unit 7. A pultrusion channel 9 is formed in the pultrusion unit 6 and in a right-to-left direction as shown in FIG. 1 the pultrusion channel 9 first has a conical tapered section and then a section with a constant diameter. On the pultrusion channel 9 in the section with the constant diameter in a direction as shown in FIG. 1 from right to left as well as in a conveying direction of hybrid yarns 21 or of the reinforcing structure 1 to be produced a first heating device 8 is first arranged and then a first cooling device 10. A cooling channel 11 is formed on the first cooling device 10, through which a cooling fluid is passed through for cooling the partially produced reinforcing structure 1. The extrusion unit 7 comprises an extrusion channel 15 and the extrusion channel 15 comprises a first conical tapered section and a second portion of a constant diameter. A second heating device 16 is formed on the second section of the extrusion passage 15 having the constant diameter. The first and second heating devices 8, 16 are preferably configured as an electrical resistance heater. In the conveying direction of the reinforcing structure 1 to be produced through the extrusion channel 15, first the conical tapering section of the extrusion channel 15 and, subsequently, the portion of the extrusion channel 15 with the constant diameter are formed. A conveying device 12 is formed between the pultrusion unit 6 and the extrusion unit 7. The conveying device 12 comprises a first conveying wheel 13 and a second conveying wheel 14, which are driven by an electric motor (not shown). The partially produced reinforcing structure 1 is arranged between the two conveyor wheels 13, 14, so that the partially produced reinforcing structure 1 is pulled out of the pultrusion unit 6 with the conveying device 12 and is pushed into the extrusion unit 7 with the conveying device 12.

The pultrusion unit 6 and the extrusion unit 7 are connected to one another by means of a connecting part 20, for example a housing which is only partially shown in FIG. 1. Furthermore, a feeding part 23 with three guide bores 24 is fastened to the connecting part 20. A hybrid yarn 21 is rolled up in each case on three coils 22. The hybrid yarn 21 consists of a fiber as a glass fiber and also has the matrix of a thermoplastic material. The matrix as the thermoplastic is arranged in the hybrid yarn 21 as a fibrous matrix or as a matrix fiber. The hybrid yarn 21 is bendable and can thus be unrolled from the coil 22. A second cooling device 17 is also attached to the extrusion unit 7. The second cooling device 17 comprises a blower 18 and a cooling tube 19. Ambient air is directed through the cooling tube 19 by means of the blower 18, specifically to the region of the reinforcing structure 1 immediately after leaving the extrusion unit 7. A cutting unit 25 serves to cut the reinforcing structure 1, which was extruded at the extrusion unit 7, as far as necessary and as a consequence to be able to produce one end of the reinforcing structure 1.

During the production of the reinforcing structure 1 from the composite material 29 with the fibers and the matrix, the composite material 29 is first conveyed through the pultrusion unit 6 and subsequently through the extrusion unit 7 by means of the conveying device 12, as shown in FIG. 1., whereby because of the length of the rods 2 and the distance between the pultrusion unit 6 and the extrusion unit 7 both processes are done at the same time. Thus, during the conveying of the composite material, the hybrid yarn 21 is unrolled from the three coils 22 and inserted into the conical tapered section of the pultrusion channel 9. At the second section of the pultrusion channel 9 with the constant-diameter, the three hybrid yarns 21 are heated with the first heating device 8, so that the thermoplastic material of the matrix melts at the hybrid yarns 21 and thereby the glass fibers in the three hybrid yarns 21 are connected together in a material-locking manner by the pultrusion process. Subsequently, the composite material with the fibers and the matrix is conveyed to the section of the pultrusion channel 9 with the first cooling device 10, thereby cooling the composite material with the glass fibers and the thermoplastic and as a consequence is hardening. After the composite material with the fibers and the matrix has emerged, the composite material with the matrix of the already partially produced reinforcing structure 1 is conveyed into the extrusion unit 7 by the conveying device 12. Because of the cooling of the composite material with the fibers in the first cooling device 10, the composite material with the fibers can be conveyed by the conveying device 12. In the extrusion unit 7 the composite material with the fibers and the matrix at the section of the extrusion channel 15 with the constant diameter is again slightly heated by the second heating device 16 in such a way that the final shaping of the cross-sectional shape of the reinforcing structure 1 to be produced is formed in the end part in the conveying direction of the extrusion channel 15. The left end of the extrusion channel 15 in FIG. 1 has a circular cross-sectional shape, so that reinforcing structure 1 with a circular cross-section are thereby produced by means of the process unit 5. After the reinforcing structure 1 have been emerged from the extrusion channel 15 of the extrusion unit 7, ambient air is passed by the blower 18 through the cooling tube 19 as cooling air to the rod 2, so that a faster cooling of the reinforced structure 1 can be achieved.

The reinforcing structures 1 produced by the method are straight or curved rods 2. The rods 2 are produced by the process unit 5 at the required connection positions on the base structure 4, so that the process unit 5 is moved on a movement path 26 as a straight line 27 or a curved line 27 by means of motion arms 28 of a robot greatly simplified in FIG. 2. The movement path 26 as the straight line 27 or curved line 27 corresponds with to the longitudinal axis of the reinforcing structure 1 produced by the process unit 5. After the production of the rods 2 and the laying of the rod 2 respectively the reinforcing structure 1 on the surface of the base structure 1, no relative movement of the produced rods 2 to other rods 2 already produced or still to be produced or the base structure 4 is necessary, because the rods 2 are produced with the process unit 5 at the required connection position on the base structure 4. As a result, the costs for the production of the support structure 3 with the base structure 4 and the reinforcing structures 1 with the process unit 5 can be substantially reduced. In FIG. 2, the coils 22 and the hybrid yarns 21 are not shown. The reinforcing structure 1 consists of rods 2 made of a composite material 29, namely with fibers as glass fibers and matrix of thermoplastic.

In a further exemplary embodiment of the process unit 5 (not shown), the fibers, for example glass fibers, aramid fibers or carbon fibers, are rolled on coils 22, and the matrix as the thermoplastic material is separated in a container with a container heating in a heated state and is conveyed to the pultrusion unit 6 by means of a matrix conveying device (not shown). The pultrusion unit 6 and the extrusion unit 7 can also be designed as a single component 29 in a way that for example after the pultrusion the extrusion is immediate operated, that is to say the final shaping of an outer side 33 of the rod 2 is operated without an arrangement of the conveyor 12 between the extrusion unit 7 and the pultrusion unit 6.

In another exemplary embodiment, which is not shown, a thermosetting plastic or plastic as reactive hotmelt respectively hotmelt adhesive respectively melt polymer is used instead of thermoplastic as the matrix. The thermosetting plastic is separately stored in a container and fed by means of a matrix conveying device to the extrusion unit 7 and/or the pultrusion unit 6. The thermosetting plastic is hardened by means of an irradiation or an addition of chemical additives. The hardening of the plastic as reactive hotmelt respectively hotmelt adhesive respectively melt polymer is especially implemented by heating as the change parameter during the processing of the matrix in the pultrusion unit 6 and/or the extrusion unit 7. Deviating from this the hardening of the plastic as reactive hotmelt can be achieved with moisture and/or UV light and/or oxygen withdrawal. If the hardening is processed with UV light, after the laying of the at least one reinforcing structure 1 on the base structure 4 an irradiation of the least one reinforcing structure 1 with UV light with an UV light source is implemented (not shown).

At the process unit 5 are attached pre-processing devices 34, 36, 38 as a tool 34 as a milling tool 35, a heating device 36 for the base structure 4, for example a laser 37 or an infrared radiator 38, and an adding device 39 for adhesive 31 (shown only in FIG. 2). The tool 34, the heating device 36 for the base structure 4 and the adding device 39 are movable with mechanical means relative to the process unit 5, so that the pre-processing devices 34, 36, 38 can be arranged in different movement paths 26 at different surfaces of the base structures 4 in the required position. Before laying the reinforcing structure 1 produced with the process unit 5 on the surface of the base structure 4, an elongated cutout 32 (FIG. 3) having an arbitrary cross-sectional shape, depending on the geometry of the milling tool 35, is milled into the base structure 4 with the milling tool 35. The cutouts 32 in this case have an undercut, so that after cooling and hardening of the composite material 29 with the fibers and the matrix within the recess 32, a positive connection of the rods 2 as the reinforcing structure 1 on the base structure 1, for example plates 30, is formed.

Subsequently, the surface of the base structure 4 is heated in the region of the cutout 32 with the heating device 36 for the base structure 4, so that the matrix of the composite material 29 can be cohesively connected to the material of the base structure 4 and after cooling and hardening of the composite material 29 and the base structure 4 a solid cohesive connection between the base structure 4 and the reinforcing structure 1 consists.

Adhesive 31 is then applied to the surface of the base structure 4 in the region of the cutout 32 by means of the adding device 39, in order to connect the reinforcing structure 1 to the base structure 4 in a material-locking manner after placing the reinforcing structure 1 on the base structure 4 and hardening the adhesive 31. In general, depending on the material of the base structure 4, only the heating device 36 for the base structure 4 or only the adding device 39 is operated. In the case of a base structure 4 made of metal, for example steel or aluminum, only the adding device 39 and not the heating device 36 for the base structure 4 are operated. In the case of a base structure 4 made of thermoplastic material, not the adding device 39 and only the heating device 36 for the base structure 4 is operated.

FIG. 5 shows a cross section of base structures 4 and reinforcing structures 1 in a first exemplary embodiment. The base structures 4 have a straight surface and the base structures 4 and reinforcing structures 1 are formed in layers over one another. For example, a layer of the base structure 4 is produced with a 3D printer and then the reinforcing structure 1 with the process unit 5. The rods 2 can also without a distance a between two adjacent rods 2 in a direction perpendicular to the drawing plane of FIG. 5 on the surface of the base structure 4 be extruded, so that the reinforcing structure 1 may have a disc-shaped geometry.

FIG. 6 shows a cross section of base structures 4 and reinforcing structures 1 in a second exemplary embodiment. The base structures 4 have a curved surface and the base structures 4 and reinforcing structures 1 are formed in layers over one another, so that the reinforcing structures 1 are also curved.

FIG. 7 shows a plan view of the base structure 4 and reinforcing structures 1 and FIG. 8 shows a perspective view of the base structure 4 with reinforcing structures 1 in a third exemplary embodiment. The base structure 4 has a straight surface, so that the reinforcing structures 1 are also straight. The reinforcing structures 1 have a distance a parallel to the drawing plane of FIG. 7. The rod-shaped reinforcing structures 1 have a length L as a longitudinal extent in a longitudinal axis of the reinforcing structures 1.

FIG. 9 shows a plan view of the base structure 4 and reinforcing structures 1 and FIG. 10 shows a perspective view of the base structure 4 with reinforcing structures 1 in a fourth exemplary embodiment. The base structure 4 has a straight surface, so that the reinforcing structures 1 are also straight. The reinforcing structures 1 have a distance a parallel to the drawing plane of FIG. 9.

FIG. 11 shows a plan view of the base structure 4 and reinforcing structures 1 and FIG. 12 shows a perspective view of the base structure 4 with reinforcing structures 1 in a fifth exemplary embodiment. The base structure 4 has a straight surface, so that the reinforcing structures 1 are also straight. The reinforcing structures 1 have a distance a parallel to the drawing plane of FIG. 7, and furthermore individual extruded rods 2 are bonded to one another in a material-locking manner without distance a by moving the process unit 5 with a corresponding movement path 26. For the cohesive connection of the rods 2, these are extruded to the effect that the matrix has not yet cooled and/or the already extruded rods 2 are heated for the cohesive connection.

FIG. 13 shows a side view of the base structure 4 and reinforcing structures 1 and FIG. 14 shows a perspective view of the base structure 4 with reinforcing structures 1 in a sixth exemplary embodiment. The base structure 4 has a curved surface, so that the reinforcing structures 1 are curved. The reinforcing structures 1 are partially arranged in cutouts 32 of the base structure 4.

Overall, significant advantages are resulted from the method according to the invention for reinforcing the base structure 4. The reinforcing structures 1 are made of the composite material 29 with fibers and a matrix. During production, the process unit 5 is moved as a straight or curved movement path 26 along a longitudinal axis of the reinforcing structure 1, in particular rod 2, so that the rods 2 made of the composite material 29 are already produced on the surface of the base structure 4 at the required connection position and thereby the costs of producing the support structure 3 are substantially reduced. When using the hybrid yarn 21, the proportion of the matrix and the fibers in the rods 2 is constant. By using a different number of hybrid yarns 21 respectively fibers for producing a respective rod 2, it is also possible to produce rods 2 with a different diameter. Furthermore, the rods 2 can also be produced in a different cross-sectional shape. For this purpose, the end of the extrusion channel 15 has an exchangeable shaping part, not shown in FIG. 1, so that rods 2 in addition to the described circular shape can also be produced simply as elliptical rods 2 or rectangular rods 2 in the cross-sectional shape. The adaptation of the reinforcing structures 1 to base structures 4 with a wide variety of geometries can be carried out simply and inexpensively by the robot moving the processing unit 5 only on an adapted movement path 26. For this purpose, the robot either has sensors for detecting the geometry of the base structure 4 and/or the geometry of the base structure 4 is stored in a computing unit of the robot. On the basis of the data of the geometry of the base structure 4, the path of movement 26 can be calculated with the computing unit at a predetermined position for the at least one reinforcing structure 1. The adaptation of the geometry of the at least one reinforcing structure 1 to the geometry of the base structure 4 can thus be processed exclusively program and/or data technically, because with the robot any movement path 26 can be implemented in space.

The invention claimed is:

1. A method for reinforcing an existing base structure with at least one reinforcing structure so as to form a support structure comprising the following steps:
producing the at least one reinforcing structure,
connecting the at least one reinforcing structure to the base structure such that the at least one reinforcing structure is connected to the base structure in a connection position and with a connection length such that at least 50% of the length of the at least one reinforcing structure is connected with the base structure wherein and the base structure together with the at least one reinforcing structure forms the support structure,
wherein the at least one reinforcing structure, is made of a composite material comprising fibers and a matrix by means of pultrusion and/or extrusion, and a pultrusion unit and/or an extrusion unit is disposed such that the at least one reinforcing structure is pultruded and/or extruded onto the base structure at a respective required connection position after the pultrusion and/or extrusion; and
wherein before a laying of the at least one reinforcing structure onto the surface of the base structure locally in a region of a later contact area between the at least one reinforcing structure and the base structure, a material of the base structure is removed.

2. The method according to claim 1, wherein the base structure is removed by machining and a tool is moved with a robot along the surface of the base structure.

3. The method according to claim 1, wherein due to removal of a material of the base structure a cutout is produced and afterwards the at least one reinforcing structure is moved into the cutout, so that a positive connection between the at least one reinforcing structure and the base structure at the cutout, especially after the cooling and hardening of the matrix, is constructed.

4. A method for reinforcing an existing base structure with at least one reinforcing structure so as to form a support structure comprising the following steps:
producing the at least one reinforcing structure,
connecting the at least one reinforcing structure to the base structure such that the at least one reinforcing structure is connected to the base structure in a connection position and with a connection length such that at least 50% of the length of the at least one reinforcing structure is connected with the base structure wherein and the base structure together with the at least one reinforcing structure forms the support structure,
wherein the at least one reinforcing structure, is made of a composite material comprising fibers and a matrix by means of pultrusion and/or extrusion, and a pultrusion unit and/or an extrusion unit is disposed such that the at least one reinforcing structure is pultruded and/or extruded onto the base structure at a respective required connection position after the pultrusion and/or extrusion;
wherein before the laying of the at least one reinforcing structure onto the surface of the base structure, the surface of the base structure is heated locally in the region of a later contact area between the at least one reinforcing structure and the base structure, with a heating device for the base structure.

5. The method according to claim 4, wherein the matrix of the pultruded and/or extruded reinforcing structure hardens at the required connection position and/ or on the base structure.

6. The method according to claim 4, wherein the at least one reinforcing structure is produced continuously, in a way that the pultrusion unit and/or extrusion unit is moved in space in a movement path at a required connection position in a distance to the base structure.

7. The method according to claim 4, wherein the pultrusion unit and/or extrusion unit is moved with a robot.

8. The method according to claim 4, wherein the length of the reinforcing structure is formed by the length of a movement path of the pultrusion unit and/or extrusion unit.

9. The method according to claim 4, wherein the fibers and preferably the matrix are continuously conveyed first through the pultrusion unit and subsequently through the extrusion unit.

10. The method according to claim 4, wherein the matrix is cooled and hardened during conveying from the pultrusion unit to the extrusion unit, so that the fibers are connected to one another in a material-locking manner.

11. The method according to claim 4, wherein the step of heating changes a property of a material of the base structure so that the heated surface becomes viscous and/or adhesive and/or liquid, so that a cohesive connection between the matrix of the at least one reinforcing structure and the material of the base structure, especially after the cooling, is constructed.

12. The method according to claim 4, wherein in the extrusion unit a cross-sectional shape, preferably circular, ellipsoidal or rectangular, of the at least one reinforcing structure is formed during extrusion, and because of the contact between the at least one reinforcing structure with the surface of the base structure the cross-sectional shape is once again shaped.

13. The method according to claim 4, wherein a length of the connection between the reinforcing structure and the base structure is larger than 90% of the length of the reinforcing structure.

14. The method according to claim 4, wherein first the base structure is produced or is made available and then the at least one reinforcing structure is produced.

15. The method according to claim 14, wherein the base structure is produced with a method that is different from the method used to produce the at least one reinforcing structure.

16. The method according to claim 4, wherein the at least one reinforcing structure is produced so that the length of the fibers corresponds in each reinforcing structure to the length of the at least one reinforcing structure.

17. The method according to claim 4, wherein the at least one reinforcing structure is formed with plastic.

18. The method as in claim 4, wherein the length of connection between the reinforcing structure and the base structure is at least 60% of the length of the reinforcing structure.

19. The method as in claim 4, wherein the length of connection between the reinforcing structure and the base structure is at least 70% of the length of the reinforcing layer.

20. The method as in claim 4, wherein the length of connection between the reinforcing structure and the base structure is at least 80% of the length of the reinforcing structure.

21. The method as in claim 20, wherein the reinforcing structure is connected to the base structure in a substantially flush manner.

22. A method for reinforcing an existing base structure with at least one reinforcing structure so as to form a support structure comprising the following steps:
    producing the at least one reinforcing structure,
    connecting the at least one reinforcing structure to the base structure such that the at least one reinforcing structure is connected to the base structure in a connection position and with a connection length such that at least 50% of the length of the at least one reinforcing structure is connected with the base structure wherein and the base structure together with the at least one reinforcing structure forms the support structure,
    wherein the at least one reinforcing structure, is made of a composite material comprising fibers and a matrix by means of pultrusion and/or extrusion, and a pultrusion unit and/or an extrusion unit is disposed such that the at least one reinforcing structure is pultruded and/or extruded onto the base structure at a respective required connection position after the pultrusion and/or extrusion;
    wherein before a laying of the at least one reinforcing structure onto the surface of the base structure, the region of a later contact area between the at least one reinforcing structure and the base structure is coated with an adhesive or bonding agent with an adding device for improvement of the connection between the at least one reinforcing structure and the base structure.

23. The method according to claim 22, wherein the adding device is moved with a robot along the surface of the base structure.

* * * * *